(12) United States Patent
Hreha et al.

(10) Patent No.: US 7,219,132 B2
(45) Date of Patent: May 15, 2007

(54) DYNAMIC RESOURCE ALLOCATION ARCHITECTURE FOR DIFFERENTIATED SERVICES OVER BROADBAND COMMUNICATION NETWORKS

(75) Inventors: William Hreha, San Jose, CA (US); Sastri Kota, Sunnyvale, CA (US)

(73) Assignee: Space Systems/Loral, Palo Alto, CA (US)

( * ) Notice: Subject to any disclaimer, the term of this patent is extended or adjusted under 35 U.S.C. 154(b) by 1065 days.

(21) Appl. No.: 09/822,691

(22) Filed: Mar. 30, 2001

(65) Prior Publication Data

US 2002/0178263 A1   Nov. 28, 2002

(51) Int. Cl.
G06F 15/16 (2006.01)
G06F 15/173 (2006.01)
H04B 7/212 (2006.01)
H04J 3/16 (2006.01)

(52) U.S. Cl. .................. 709/217; 709/240; 370/347; 370/437

(58) Field of Classification Search ........... 709/207, 709/226, 229, 232, 235, 238, 240, 242, 224, 709/231, 217; 370/395.21, 395.41, 235, 370/335, 347, 412, 437
See application file for complete search history.

(56) References Cited

U.S. PATENT DOCUMENTS

| | | | | |
|---|---|---|---|---|
| 4,963,853 A * | 10/1990 | Mak | ................. | 370/464 |
| 5,886,995 A * | 3/1999 | Arsenault et al. | ......... | 370/477 |
| 6,009,306 A * | 12/1999 | Hargis | ................. | 455/12.1 |
| 6,085,253 A * | 7/2000 | Blackwell et al. | ......... | 709/235 |
| 6,141,534 A * | 10/2000 | Snell et al. | .......... | 455/12.1 |
| 6,215,776 B1 * | 4/2001 | Chao | ................. | 370/316 |
| 6,240,073 B1 * | 5/2001 | Reichman et al. | ......... | 370/319 |
| 6,324,184 B1 * | 11/2001 | Hou et al. | .......... | 370/468 |
| 6,335,927 B1 * | 1/2002 | Elliott et al. | .......... | 370/352 |
| 6,400,696 B1 * | 6/2002 | Hreha | ................. | 370/316 |
| 6,400,706 B1 * | 6/2002 | Cousineau | .......... | 370/350 |
| 6,449,251 B1 * | 9/2002 | Awadallah et al. | ..... | 370/229 |
| 6,449,267 B1 * | 9/2002 | Connors | ............. | 370/347 |
| 6,614,804 B1 * | 9/2003 | McFadden et al. | ..... | 370/468 |
| 6,631,122 B1 * | 10/2003 | Arunachalam et al. | . | 370/332 |
| 6,711,398 B1 * | 3/2004 | Talaie et al. | .......... | 455/403 |
| 6,718,552 B1 * | 4/2004 | Goode | ................. | 725/95 |
| 6,721,278 B1 * | 4/2004 | Rimhagen et al. | ..... | 370/252 |
| 6,775,231 B1 * | 8/2004 | Baker et al. | ......... | 370/230.1 |

(Continued)

OTHER PUBLICATIONS

Maarten et al., Resource Allocation and Management in Diffserv Networks for IP Telephony, pp. 33-39.*

Primary Examiner—Ario Etienne
Assistant Examiner—El Hadji Sall
(74) Attorney, Agent, or Firm—Kenneth W. Float; Anthony W. Karambelas

(57) ABSTRACT

Dynamic resource allocation that provides differentiated services over a broadband communication network. The system comprises a gateway that interfaces to an Internet service provider or corporate network, a local area network edge device, a satellite that provides a communication link between the gateway and the local area network edge device, and one or more personal computers coupled by way of a network to the local area network edge device. The dynamic resource allocation system supports differentiated services with different levels of priority and comprises an Internet protocol network that includes a classifier for identifying specific types of messages, and a dynamic assignment/multiple access (DAMA) communication protocol for transmitting data over the system.

17 Claims, 3 Drawing Sheets

U.S. PATENT DOCUMENTS 6,804,252 B1 * 10/2004 Johnson ..................... 370/458
6,826,598 B1 * 11/2004 Titmuss et al. ............. 709/212
2001/0043613 A1 * 11/2001 Wibowo et al. ............ 370/468
2002/0021701 A1 * 2/2002 Lavian et al. ............... 370/401

* cited by examiner

DYNAMIC RESOURCE ALLOCATION ARCHITECTURE FOR DIFFERENTIATED SERVICES OVER BROADBAND COMMUNICATION NETWORKS

BACKGROUND

The present invention relates generally to satellite-based communication systems, and more particularly, to a dynamic resource allocation architecture or system that may be used to provide differentiated service over broadband communication networks.

The increasing demand for the high bandwidth usage over the Internet has positioned the broadband communication networks to play a significant role. User applications vary from time-critical data such as voice, to high bandwidth-sensitive applications such as Web services. Voice services require low packet transmission time whereas data applications require high bandwidth and data integrity. New Quality of Service (QoS) architectures must be developed and integrated with sophisticated resource allocation algorithms for broadband communication infrastructures, especially when bandwidth is oversubscribed.

The present invention relates to the efficient dynamic resource allocation and management for differentiated service (DS) users supported by broadband communication network infrastructures such as cable or satellite. The Internet Engineering Task Force (IETF) has been developing QoS architecture, which architecture was specified for QoS guaranteed technology in Internet Protocol (IP) networks. In addition, many resource allocation protocols have been proposed for specific set of user service, for example data requirements, but do not meet the broadband network multimedia user requirements. In particular, resource allocation technology developments do not meet the different service requirements. For example, resource allocation management systems supporting differentiated service over broadband multimedia satellite network environment do not exist.

It would be desirable to have systems that improve the bandwidth efficiency and provide the desired QoS for differentiated services over satellite networks with resource management using an onboard controller or ground-based control. It is therefore an objective of the present invention to provide for a dynamic resource allocation architecture for supporting differentiated services over a network.

SUMMARY OF THE INVENTION

To accomplish the above and other objectives, the present invention provides for a dynamic resource allocation architecture or system for use in a communication system that supports differentiated services with different levels of priority. The objective is to improve the quality of service (QoS) for communication services between a local area network edge device and a gateway that interfaces to an Internet service provider or corporate network.

The communication system comprises one or more personal computers coupled by way of a network to the local area network edge device. For example, the local area network edge device communicates by way of a satellite with the gateway. The satellite implements a communication link between the local area network edge device and the gateway. The satellite provides connectivity to the aggregation point on the ground, which is the gateway in the case of a non-processing satellite or an onboard resource management element in the case of a processing satellite.

The dynamic resource allocation architecture or system implemented in the communication system comprises an Internet protocol network that includes a classifier for identifying specific types of messages, and a dynamic assignment/multiple access (DAMA) communication protocol for transmitting data over the system.

The transport protocol supported at a transport layer of the dynamic resource allocation architecture or system may be a Transmission Control Protocol (TCP) or User Datagram Protocol (UDP). For example, the local area network edge device may use Internet Protocol (IP) and IEEE 802.3 Ethernet Protocol, Universal Subsystem Bus (USB), or IEEE 802.11 media access protocols.

The service differentiation to accommodate user application requirements and expectations is achieved by architectures specified by ETF-RFC 2475. The user traffic is classified, marked, and policed. The traffic is appropriately marked using a differentiated service (DS) field in IPv4 or IPv6 headers. Based on classification and marking, the traffic is queued and buffered prior to resource allocation. The differentiated service may be prioritized and queued into seven queues (in a reduced-to-practice embodiment), ranging from highest to lowest priority.

Differentiated service classes are managed using a dynamic resource allocation architecture. The dynamic resource allocation architecture comprises resource request, resource usage detection, resource allocation and scheduling algorithms. The resource allocation may also depend on policy rules and static resource planning information. The resource allocation algorithms may be used in time division, code division or frequency division multiple access systems, for example. The signaling protocol used in the present invention is based on public signaling standards, such as Digital Video Broadcasting (DVB), DVB-RCS001, Rev. 14, IEEE 802.16, or IETF-RFC 2205, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which.

DETAILED DESCRIPTION

Figure 1:
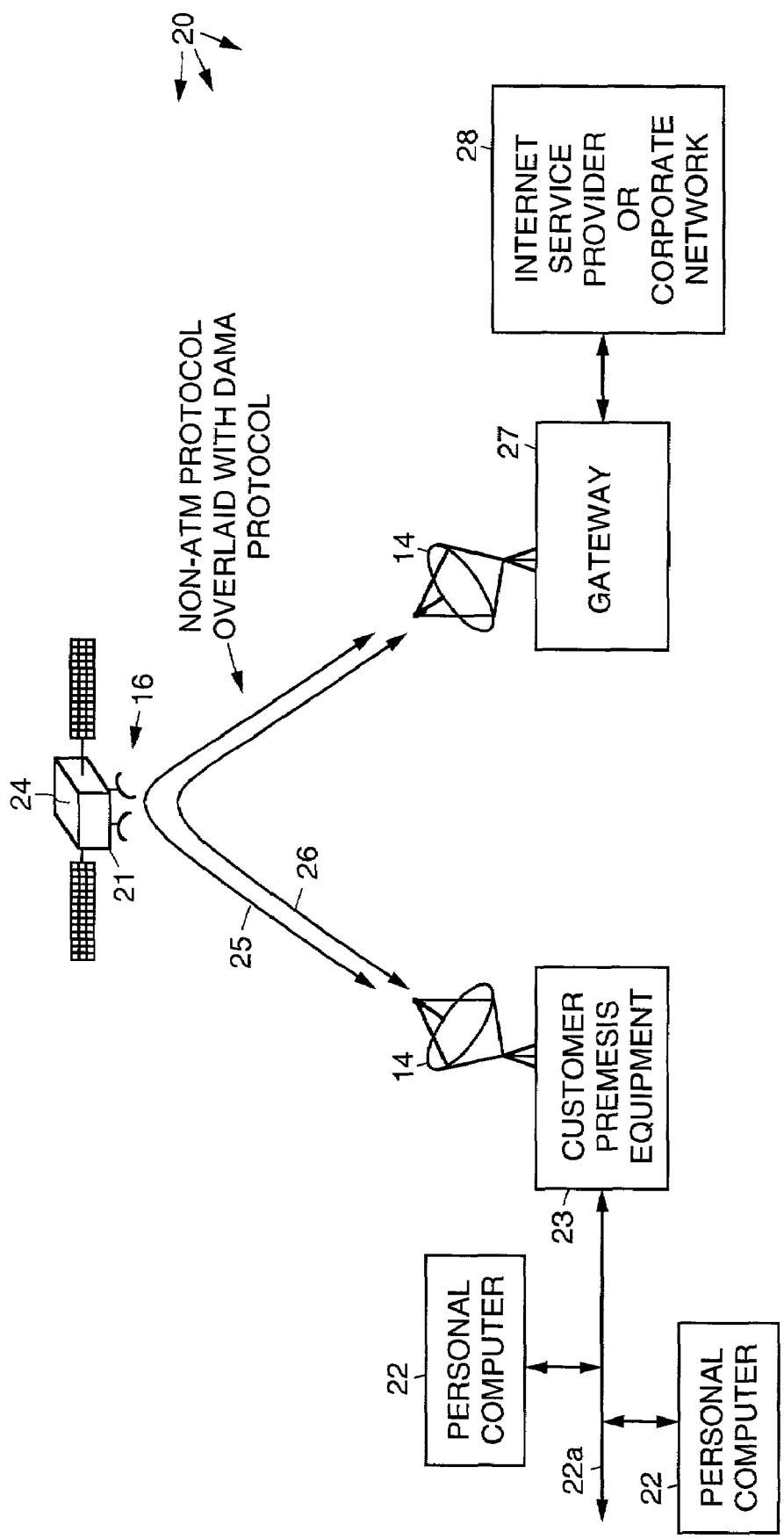
FIG. 1 illustrates the topology of an exemplary communications system in accordance with the principles of the present invention.

Referring to the drawing figures, FIG. 1 illustrates the topology of an exemplary communications system 20 in accordance with the principles of the present invention. The system 20 comprises one or more personal computers 22 that are coupled by way of a network 22a to a local area network edge device 23 or first terminal 23, comprising customer premises equipment 23 having an antenna 14. The personal computers 22 may be networked by way of an Ethernet network 22a, for example. The local area network edge device 23 communicates by way of a satellite 21 having an antenna system 16 with a gateway 27 having an antenna 14. The gateway 27 interfaces to one or more internet service providers 28 or a corporate network 28. The satellite 21 may be a non-processing satellite 21 that implements a bent pipe communications link 24 between the local area network edge device 23 and the gateway 27. Alternatively, the satellite 21 may be a processing satellite 21 having an onboard resource management element.

The system 20 is designed to provide high-speed, cost-effective, and reliable data connectivity required by consumers with point-to-point and point-to-multipoint service markets. The networking protocol supported by the local area network edge device 23 is the Internet Protocol (IP). Internet Protocol (IP) signals may be routed using 802.3 Ethernet, universal system bus (USB), 802.11 Ethernet, or other known or future protocols.

The service provided by the system 20 is implemented using point to point connectivity between the local area network edge device 23 and a data source 28 such as an internet service provider 28 or the corporate network 28. This is enabled by the non-processing (bent pipe) or processing satellite 21 that provides a fixed connectivity to an aggregation point on the ground (the gateway 27).

Resource allocations are based on consumer profiles, communication link bandwidth limitations, and end-to-end error rate performance. Typical resource allocations include time slots and frequency assignments for use by the edge device 23. The resource allocations are determined by algorithms operating at the gateway 27.

Signaling within the system 20 is based on non-ATM protocols. The non-ATM protocols are preferably selected from public multiple access control (MAC) signaling standards. Such public multiple access control signaling standards include digital video broadcasting—return channel over satellite (DVB-RCS), data over cable service interface specification (DOCSIS) and 802.16, for example. However, it is to be understood that other multiple access control signaling standards may be employed.

The signaling may be based on a proprietary protocol developed by the assignee of the present invention. Each of the multiple access control signaling standards supports both in-band and out-of-band signaling. Furthermore, signaling may be based on derivatives of the above-mentioned standards.

The system 20 employs dynamic assignment/multiple access (DAMA) algorithms that are built on top of (overlay) a selected one of the above-mentioned multiple access control signaling standards. Although any of the above-mentioned multiple access control signaling standard may be employed in the system 20, the one that provides the best bandwidth efficiency is a preferred choice for implementation. The system 20 accommodates multiple types of data, video or voice traffic. Quality-of-service levels may be guaranteed by the use of differentiated services (DiffServ)-like protocols.

The dynamic assignment/multiple access (DAMA) algorithms that implement communication protocols in the local area network edge device 23 may include the following types of algorithms, for example. A first is an application detection algorithm. Another is an application prioritization algorithm. Another is an algorithm that estimates resource requirements based on queue statistics versus performance statistics. Another is an algorithm that generates a resource request or sends raw queue statistics to the gateway 27 to set required resources. Another is an algorithm that performs weighted fair queuing that drains the queues while effectively utilizing the gateway assigned resources.

Algorithms that may be implemented in the gateway 27 may include the following types of algorithms, for example. One algorithm is an algorithm that accumulaes all requests received at substantially the same time. Another is an algorithm that functions to assign each edge device a time and frequency resources based upon services classes and consumer profile for each current and previous request.

Figure 2:
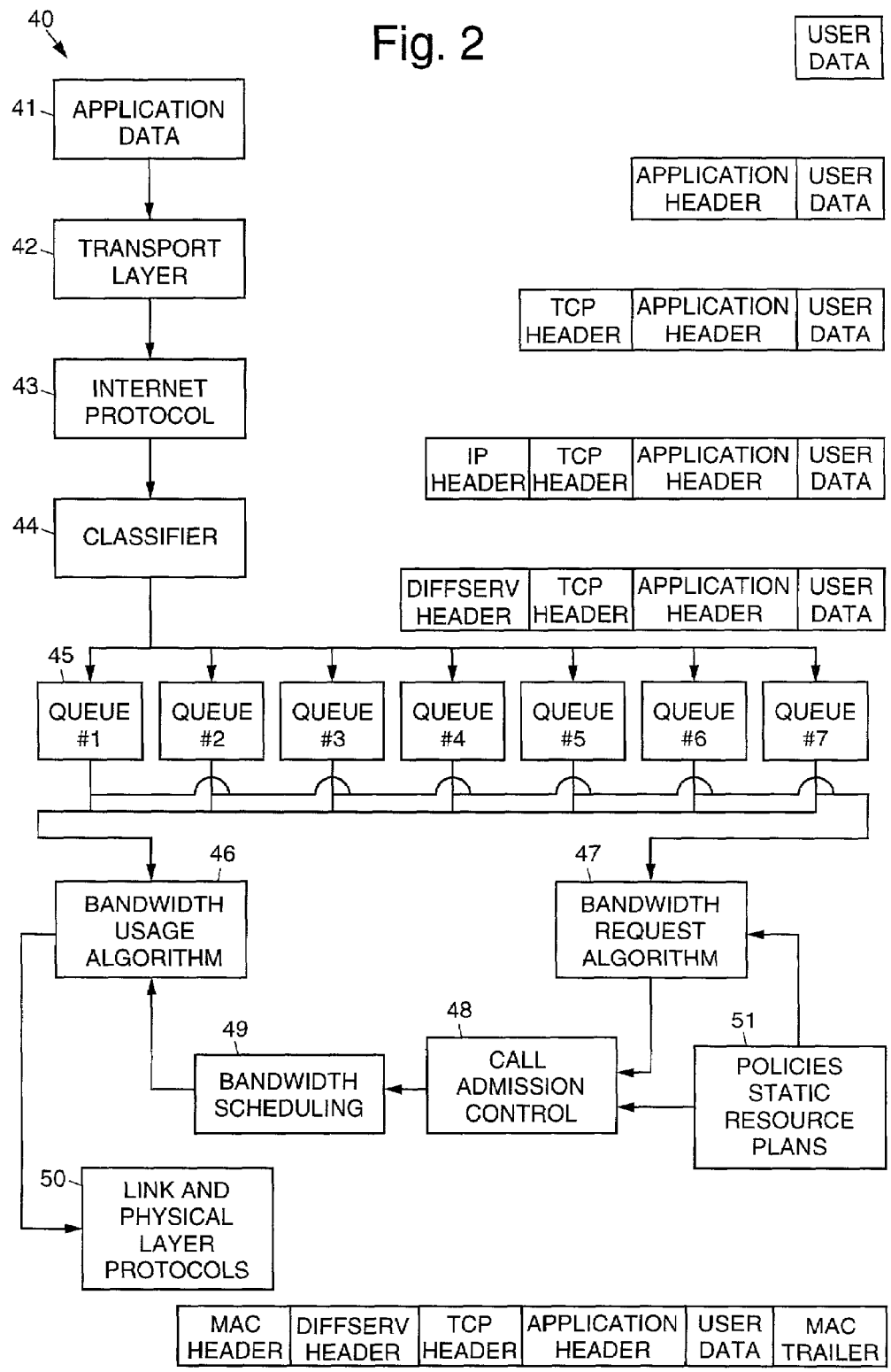
FIG. 2 is a flow diagram illustrating an exemplary communication resource allocation architecture in accordance with the principles of the present invention.

FIG. 2 illustrates the functional flow diagram of an exemplary communication resource allocation architecture 40 in accordance with principles of the present invention that may be used in the system 20 shown in FIG. 1. Network application data 41 such as file transfer protocol (FTP), Telnet, Web browsing, video conferencing, and voice, for example, are supported at an application layer and provides an interface to the network 22a by adding application header to the user data (shown at the right side of FIG. 2).

The application data passes from a network application program interface through a standard transport protocol of a transport layer 42 such as the Transmission Control Protocol (TCP) or User Datagram Protocol (UDP). A transport protocol header is appended to the application packet (shown at the right side of FIG. 2). The data segment passes to the Internet Protocol level 43, where the standard Internet Protocol (IP) provides logical addressing information and encloses the data in a datagram by appending an IP header to the TCP packet (shown at the right side of FIG. 2).

The IP packets are classified and marked according to a standard architecture such as IETF "Architecture for Differentiated Services" RFC2475, for example, in a classifier 44. The packet flows are detected and the packets are classified into DiffServ Code Points (DSCP) (shown at the right side of FIG. 2). The IETF RFC 2474 "Definition of the Differentiated Services Field (DS Field) in the IPv4 and IPv6 Headers" specifies the IP header field, which is called a Differentiated Services field. Each classified DSCP is marked on the IP header as a part of a marking function (shown at the right side of FIG. 2). For example, the classified packet flows are queued 45 into seven categories such as those listed below:

| Highest Priority | 7 | Internet signaling |
|---|---|---|
| | 6 | Service access network signaling |
| | 5 | Time-critical interactive traffic |
| | 4 | Reserved |
| | 3 | Time-critical business traffic |
| | 2 | Reserved |
| Lowest Priority | 1 | Best effort |

As is illustrated in FIG. 2, the classified and marked data are scheduled 49 based on a bandwidth request algorithm 47, and a call admission and control algorithm 48, a connection acceptance algorithm 50, a bandwidth usage detection algorithm 46 and related policies 51. A multiple access control (MAC) header and a multiple access control (MAC) trailer are appended to the packets (illustrated at the bottom of FIG. 2). A resource assignment algorithm 60 (FIG. 3) allocates user demand. The amount of user demand allocation depends on the fairness dictated by policies and user priority classification.

The resource management or assignment algorithm 60, which may be referred to as a dynamic resource allocation for multimedia services (DRAM) algorithm 60, which is a key aspect of the present invention, allocates resources in a dynamic manner to meet requirements of multimedia service traffic profiles. The resource assignment algorithm 60 may be used in TDMA, FDMA, and CDMA systems.

Figure 3:
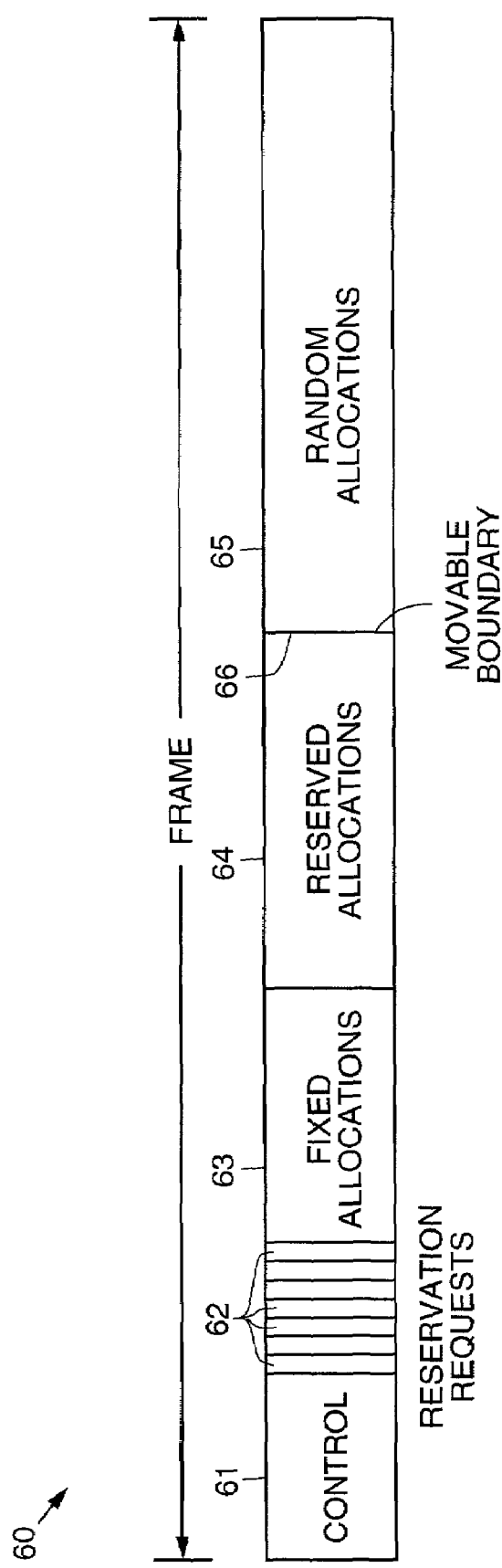
FIG. 3 illustrates a frame structure for resource allocation TDMA example.

FIG. 3 illustrates resource allocation 60 in accordance with the present invention for a TDMA system. The resource allocation is also based on policy rules and the static resource planning information as shown in FIG. 2. The IETF internet drft-ietf-diffserv-pib-02.txt "Differentiated services Quality of Service Policy Information Base" specifies a set of policy rule classes for configuring QoS policy for differentiated services. In this DRAM protocol, a frame of data includes a control portion 61, reservation requests 62, and contains fixed allocations 63 that provide for a fixed allocation mode 63, reserved allocations 64 that provide for a reserved allocation mode 64, and random allocations 65 that provide for a random allocation mode 65.

This DRAM protocol thus has three modes: fixed assignment 63, reservation assignment 64, and random assignment 65. In the fixed assignment mode 63, a certain amount of bandwidth is allocated for the highest priority users. For example, signaling and real time traffic are allocated a guaranteed bandwidth that do not have to wait in a queue.

In the reservation assignment mode 64, reservation bandwidth is allocated for the users to request their demand without the knowledge of other's request transmissions. A smaller amount of bandwidth (e.g., slots, frequencies, and sequences) is used for this purpose. If more than one user uses the same slot or sequence, a collision occurs and the users must retransmit their requests after a random retransmission interval. The reservation slots or frequencies are used to support users with different QoS requirements. Once the reservations are successful, the data is transmitted in the reserved slots.

In the random access mode 65, users transmit data without the need to make reservations. This random access mode 65 allows users not to wait for reservations and the QoS is not guaranteed. Best effort class users use this portion of the bandwidth. A collision resolution algorithm may be used to resolve collisions to improve throughput. A boundary 66 between the random access mode 65 and the reservation mode 64 is movable in order to reduce the number of collisions whenever there are more best effort users using the system 20.

The resource management or assignment algorithm 60 also uses mechanisms that control allocation of the resources on a per-hop basis and on an end-to-end (per-flow) basis. The scheduling algorithms range from a simple Packet Round Robin (PRR) algorithm to sophisticated Round Robin Weighted Fair Queuing (WFQ) algorithms, for example.

Thus improved dynamic resource management systems have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A dynamic resource allocation system comprising:
   one or more personal computers coupled to a local area network edge device that generates a resource request in response to received data from a user of said personal computer;
   a satellite that provides a communication link;
   one or more Internet protocol networks;
   a gateway in connection with said local area network edge device via said communication link and interfaces to one or more said Internet protocol networks, wherein said gateway receives said resource request from said local area network edge device to set required resources;
   a generator for generating messages of different types from said user data;
   a classifier for identifying specific types of said messages;
   a marker for marking said identifying messages; and
   a scheduler for scheduling said marked messages;
   wherein said gateway dynamically allocates resources to meet the requirements of each said marked messages by applying a dynamic assignment/multiple access (DAMA) communication protocol for transmitting data between said one or more personal computers and said one or more Internet protocol networks;
   wherein said DAMA communication protocol comprises three modes, including fixed assignment, reservation assignment, and random assignment modes.

2. The dynamic resource allocation system recited in claim 1 wherein the satellite is a non-processing satellite.

3. The dynamic resource allocation system recited in claim 2 wherein the non-processing satellite implements a bent pipe communications link between the local area network edge device and the gateway.

4. The dynamic resource allocation system recited in claim 1 wherein the satellite is a processing satellite comprising an onboard resource management element.

5. The dynamic resource allocation system recited in claim 1 wherein the DAMA communication protocol comprises an application detection algorithm.

6. The dynamic resource allocation system recited in claim 1 wherein the DAMA communication protocol comprises a resource requirement estimation algorithm that is based on queue statistics versus performance statistics.

7. The dynamic resource allocation system recited in claim 1 wherein the DAMA communication protocol comprises a resource request that generates a resource request to set required resources.

8. The dynamic resource allocation system recited in claim 1 wherein the DAMA communication protocol comprises a resource request that sends raw queue statistics to the gateway to set required resources.

9. The dynamic resource allocation system recited in claim 1 wherein the DAMA communication protocol comprises a weighted fair queuing algorithm that performs a weighted fair queuing that drains the queues while effectively utilizing the gateway assigned resources.

10. The dynamic resource allocation system recited in claim 1 wherein the gateway comprises an algorithm that accumulates all requests received at substantially the same time.

11. The dynamic resource allocation system recited in claim 1 wherein the gateway comprises an algorithm that functions to assign each edge device a time and frequency resources based upon services classes and consumer profile for each current and previous request.

12. The dynamic resource allocation system recited in claim 1 wherein, in the fixed assignment mode, a certain amount of bandwidth is allocated for the highest priority users.

13. The dynamic resource allocation system recited in claim 1 wherein, in the reservation assignment mode, reservation bandwidth is allocated for users to request their demand without knowledge of others request transmissions.

14. The dynamic resource allocation system recited in claim 1 wherein, in the random assignment mode, users transmit the data without making reservations.

15. The dynamic resource allocation system recited in claim 1 wherein the boundary between the random assignment mode and the reservation mode is movable in order to reduce the number of collisions whenever there are more best effort users using the system.

16. The dynamic resource allocation system recited in claim 1 wherein the DAMA communication protocol comprises a collision resolution algorithm.

17. The dynamic resource allocation system recited in claim 1 wherein the DAMA communication protocol comprises a bandwidth request algorithm, a connection acceptance algorithm, a bandwidth usage detection algorithm, and a resource assignment algorithm.

* * * * *